INVENTOR.

BY EDWARD EMANUEL SHELDON

United States Patent Office 3,279,460
Patented Oct. 18, 1966

3,279,460
ENDOSCOPES
Edward Emanuel Sheldon, 30 E. 40th St., New York, N.Y.
Filed Dec. 4, 1961, Ser. No. 158,638
12 Claims. (Cl. 128—6)

This invention relates to a novel endoscopic instrument i.e. instrument for examination of the internal organs of the body such as gastrointestinal tract including oesophagus, stomach, intestine, small and large, rectum, pulmonary tract including trachea, bronchi, urinary tract or peritoneal and pleural cavities and has a common subject matter with my U.S. Patents No. 2,764,148, filed July 11, 1950 and No. 2,764,149, filed May 23, 1951 and with my U. S. Patent 2,877,368 filed March 11, 1954 and issued on March 10, 1959, and 3,021,834 filed November 28, 1956 and issued on February 20, 1962. The present endoscopic devices consist of straight tubes which are either hollow or are provided with lenses or prisms. Due to inability of light to see around the corners, the present endoscopes have to be absolutely straight and rigid so that the eye of the examiner and the examined part of the patient's body are in one straight line. The endoscopes using optical lenses or prisms do not improve this situation as the shape and the size of the examined organs is so variable that the position of the curves and angles of the organs is absolutely unpredictable and therefore the lenses or prisms cannot be positioned to anticipate these multiple deviations of the axis of the examined organ from the straight line.

The purpose of my invention is to provide a method and device for visual examination of the internal organs regardless of their size and shape and of the angle of their curvatures which as previously impossible until now, represents therefore an important process in medical diagnosis.

Another purpose of this invention is to provide means for introduction of the endoscopic instrument into a patient's body under constant visual control which is the most important factor in the safety of performance of endoscopic examination.

Another purpose of my invention is to enable simultaneous observation by many examiners, in close or remote locations, which was not possible until now. This is of great importance as the endoscopic procedures being extremely strenuous for the patient have to be performed very fast so that there is no time available for other examiners to inspect the examined field.

Another purpose of my invention is to provide means for simultaneous visual inspection, and photographic recording of the examined organ which also has never been possible before.

Another purpose of this invention is to provide means for inspection of inaccessible channels, such as hollow parts of machinery or of other inaccessible tortuous passages. My device may be introduced inside of a part which cannot be inspected visually without dismantling or destroying the whole machine and will transmit the image of said part to the observer outside of said part. My invention will be especially useful for the examination of coils and pipes or other curved structures. My device can be also used as a probe to be inserted into a solid object and to transmit information about its internal structure.

Another objective of my invention is to intensify the image of the examined internal parts or passages so that the final image will be presented to the observer with the luminosity facilitating inspection of said image.

Another objective of this invention is to change, decrease or amplify the contrast of the image of the examined part.

The objectives of my invention were realized by a novel device which is flexible to allow its introduction into the examined part regardless of its curvatures or angulations and which after its introduction into the examined part will produce a light image of said part. Video signals are reconverted in receivers outside of the examined part into visible images for inspection or recording. My intrascopic device can produce black and white images, as well as multicolor images, showing faithfully or arbitrarily the colors of the examined part.

In particular this novel device besides other inventive features makes the use of a television pick-up tube consisting of two separate independent elements which can be introduced separately into the examined part and which after introduction work in cooperation as a television camera. As each of these two separate elements is smaller in size than any conventional television camera can be made, this novel television camera can be introduced into locations which, because of small size or tortuous shape of passages leading to them, were inaccessible to the most miniaturized television cameras known in the art.

Another marked improvement in my novel television camera is elimination of magnetic deflecting and focusing coils which are bulky and occupy so much space that even a small television tube using them cannot be introduced into narrow passages. The use of conventional electrostatic deflecting system results in a marked distortion of images especially on pick-up tubes using the slow scanning electron beam. These drawbacks are eliminated in my intrascope and therefore in spite of its very small size it is capable of producing images of a good definition and contrast.

In the drawings:

FIGURES 1A, 1B, 1C and 1D show modifications of the image sensitive member.

FIGURE 1b shows the intrascope in combination with the pushing guide for introduction of component parts of the television camera into the intrascope;

FIGURES 3, 4, 5 show a novel endoscope having image conductor;

Figure 1:
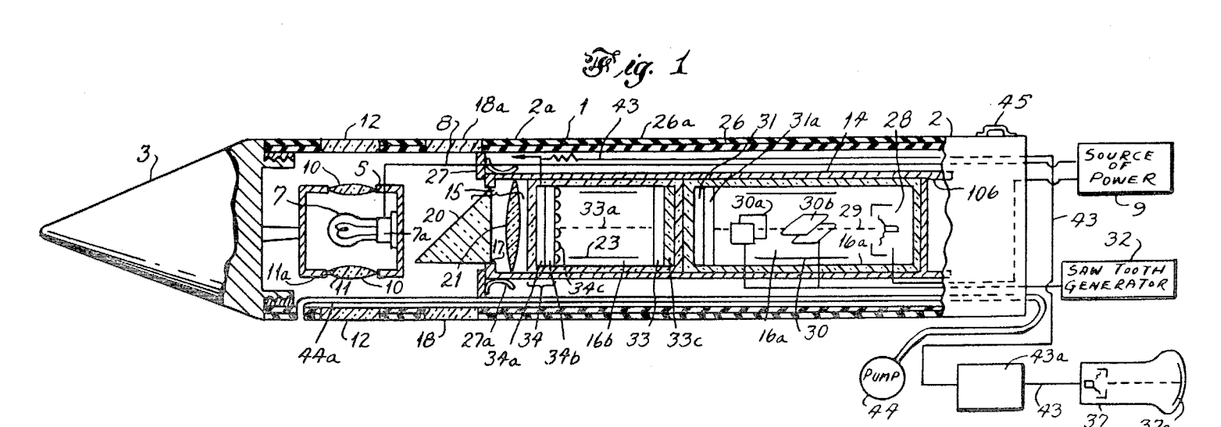
FIGURE 1 represents a partially sectioned view of the novel instrument for inspection of inaccessible parts.

This new device which may be called the intrascope or endoscope 1 is shown in FIGURE 1. The handle 2 is a hollow tube of diameter corresponding to the examined part. The handle may be rigid or semiflexible or completely flexible according to the part to be examined. At the end of the handle begins the flexible part 2a of the intrascope which also has width and length suitable for the size of the examined part. In case the intrascope is used for examination of fragile parts, the part 2a must be very flexible and pliable in order to avoid damage to the wall of the examined part. This basic feature of the material for the flexible part of the intrascope is therefore that it must be easily bent and molded by the walls of the passages in which it is being introduced. Such material may be rubber 26 or a suitable plastic, of the type used by Davol Rubber Company of Providence, Rhode Island. In case the intrascope is used for investigation of sturdy parts or of machinery, the part 2a may be more rigid. The flexible part 2a of the intrascope may be in such a case made of the stainless steel spiral sheet designed not only for durability but also to maintain the proper degree of flexibility and elasticity. The metal spiral is tapered to insure its uniform bending. The intrascope may be covered with an outer tubing 26a such as of neoprene. This prevents dust particles and moisture from affecting the optical and pickup system located inside of the intrascope. At the end of the flexible part there is a semiflexible tip 3 which may be screwed on the flexible part and can be easily removed giving thereby access to the inner structures of the intrascope. The tip consists of a rubber conical finger and serves to facilitate the gliding of the intrascope within the examined part. In order to facilitate the introduction of the intrascope into parts which have no curves, my device can be made semirigid by inserting into it a semirigid stylet. In case the intrascope is used as a probe for insertion into a solid object, the tip 3 should preferably be rigid and sharply pointed to be able to pierce the examined object. In some cases the tip is provided with one or more windows at its end to transmit the light to the examined part and to receive the image of said part. The tip may also have a semi-spherical or other shape.

In some cases the examined part has to be distended by air or fluid insufflation prior to the examination. A special air pump attachment 44 and a channel 44a in the intrascope is provided for this purpose. The channel 44a may also serve to evacuate contents of the examined part before examination to improve visibility. The knob 45 on the proximal end of the intrascope serves to indicate to the examiner the position of windows 12 and 18 of the intrascope. In examination of living bodies, the layer 26 or 26a should be of highly dielectric material to prevent any short circuits.

In the distal end of the flexible part of the intrascope there is a housing box 5 containing the illumination system 7. The box 5 may also be attached to the inner walls of the intrascope by means of the brackets or may be held by springs. It is obvious that there are many means for attachment of the box 5 which are well-known in the art. All walls of the housing box 5 except the one facing the television pickup tube 16 are provided with windows 10 for transmission of the light from the illuminating system 7. These windows are correlated with the windows 12 in the flexible part of the intrascope which transmit the light from the illuminating system to the examined part. In some cases the windows 12 may be made to extend over the circumference of the intrascope. In some cases the window to transmit illumination from the light source to the examined part may also be provided in the distal end of the intrascope instead of being in its side walls, and in such case the tip may be made of transparent material or may be omitted. Windows 12 may be provided with shutters which can be controlled from the proximal end of the intrascope which is outside of the examined part.

The illuminating system may consist of the electrical bulb 7. The electrical bulb may be mounted in the housing box 5 by means of a socket 7a. In some cases it is advantageous to use the objective lens 11 between the light bulb and window 12 in order to concentrate the light on one field. The lens may be held in position by brackets 11a. The light bulb is activated by the source of electrical power 9 situated outside of the examined part. Such a source may be the commercial electrical current or battery of dry cells. The flexible electrical cable 8 leads from the socket 7a to said outside source of electrical current 9. The cable is a lacquered, double insulated electric wire, is covered in addition with liquid rubber and is vulcanized in order to prevent a short circuit. The housing unit 5 may be in some cases omitted and the light source may be attached to the socket 7a which is held by brackets. In some cases electrical power of very high frequency is preferable.

In the flexible part 2a proxially to the housing box 5, there is a rigid nontransparent housing compartment 14 containing the optical system 15 and the novel television pickup tubes 16a and 16b. The housing 14 has an opening 17 in which the optical system 15 is lodged and which serves to admit the image of the examined part. This opening is correlated with windows 18 in the flexible part of the intrascope which transmit the image of the examined part. In some cases the windows 18 may be made to extend over all the circumference of the intrascope. The windows 18 may be provided with shutters operated from the proximal end of the intrascope which is externally to the examined part. The housing 14 containing the television pickup tubes 16a and 16b and the optical system may be attached to the inner wall of the flexible part 2a of the intrascope by means of brackets or may be held by springs 27a. As the housing box fits into the encasing holding member 26 and is held by it tightly, in some cases no additional supporting means such as springs are necessary.

The optical system 15 may consist of 90° gable prism 20 and of lens 21. The optical system may have its own housing unit instead of being lodged in the compartment 14 and may then be introduced into the intrascope separately.

In some cases it is desirable to have a large field of vision and at the same time to preserve the necessary demagnification of the examined part. In such case, instead of the prism 20, a rotating mirror should be used. The mirror has first surface coating which eliminates the reflections and is activated by the magnetic solenoid placed beneath the mirror. The solenoid is connected by the elastic cable with the controls outside of the examined part and can tip the mirror from the retrograde position to the forward position, giving thereby an additional field of vision without the necessity of moving the intrascope. The image of the examined part is reflected by the mirror on the objective lens which focuses said image on the photocathode of the novel television pickup tube 16b described below. In case the demagnification of the examined part is not necessary a large field of vision can be obtained by using the lens providing 80° field of vision instead of usual 45–50°. The image produced by the optical system is inverted but it can be reverted to the original position either by an additional lens or electron-optically in the viewing tube. The rotating mirror may also serve to admit image either through window 18 or 18a without rotating the whole camera 16.

The housing box 14 contains the novel miniature television camera 16 which was designed to reduce to the minimum the size of the television camera. The television pickup tubes known previously in the art could be miniaturized only to a certain degree, which was not sufficient in certain applications as some of the examined parts are too small to allow the introduction even of the smallest conventional pickup tube. This is true especially for the type of tubes having external deflecting coils such as of magnetic or electromagnetic type, and in such situations, my novel camera 16 will be very suitable as it does not require any external deflecting or focusing coils at all. The camera 16 consists of two vacuum tubes 16a and 16b. The tube 16a has an electron gun 28 which produces an electron beam 29. The electron beam 29 is focused by electrostatic field 30. The electron-optical system for focusing the electron beam 29 may be simplified and markedly reduced in length by using the uni-potential electrostatic lens instead of the usual two-lens system. The electron beam 29 is deflected by electrostatic plates 30a and 30b in two perpendicular to each other planes. The electrostatic plates are energized by signals from sawtooth generators 32 which are situated outside of the examined part. The generators 32 are connected with electrostatic plates 30a and 30b by means of flexible wires. One deflecting field is produced by the horizontal deflection plates 30a and may have line frequency such as 5–15,000 cycles per second. Another deflecting field is provided by the vertical deflection plates 30b and may have field frequency such as 15–60 cycles per second. In this way the electron beam 29 is made to scan the fluorescent screen 31 in a regular television raster. The fluorescent screen 31 may be in some cases provided with electron-transparent metallic conducting backing layer 31a such as of aluminum. The fluorescent screen 31 must be of a phosphor of a very short persistence in order to obtain a good resolution of the image. ZnO has decay time of 1 microsecond and is suitable for this purpose. Still better results may be obtained by means of ZnS phosphor and using only ultraviolet component of its fluorescent emission which has decay time of 1/10 microsecond. In some cases, it is preferable to make the fluorescent screen 31 of semispherical curved shape as it will improve definition of the flying light spot. The fluorescent layer 31 may also be deposited on a supporting mesh screen instead of being deposited on the wall of the vacuum tube. This will improve definition of the flying light spot.

The vacuum tube 16a operates in combination with the vacuum tube 16b forming together the novel television camera 16. The vacuum tube 16b has a photoemissive electrode 33 which may be deposited or attached to one of the walls of said vacuum tube. In some cases it is preferable to provide a light transparent conducting layer 33, such as of material known in the trade as "Nesa," or of compounds of tin or of cadmium, on the side of said photoemissive electrode 33 facing the fluorescent screen 31. Such a layer must be very thin, e.g., of the order of microns in order not to impair the definition of images produced by the novel pickup tube. The photoemissive electrode 33 may be of CsOAg or of caesium, sodium, lithium or rubidium on antimony, arsenic or bismuth, or of a mixture of aforesaid elements. At the opposite end of the vacuum tube 16b there is provided a photocathode 34 which consists of a light transparent signal plate 34a, a light transparent insulating layer 34b and a photoemissive mosaic 34c. The signal plate 34a may be a thin transparent layer of metal or other conducting material. The insulating layer 34b may be of mica, silica, or other transparent dielectric material and photoemissive mosaic 34c may be of CsOAg or of caesium, rubidium, potassium or lithium on antimony, arsenic or bismuth, or of a mixture of aforesaid elements. In some cases the photoemissive layer 34c may be, instead of a mosaic, also of continuous type. In cases in which electrostatic focusing field 23 is used to focus the scanning electron beam 33a on the mosaic 34c, much better resolution will be obtained by making such mosaic of a curved semispherical shape. In addition, the use of such spherically shaped photocathode will eliminate instability of the image which is very marked when using electrostatic fields for focusing a slow electron beam.

Figure 1A:
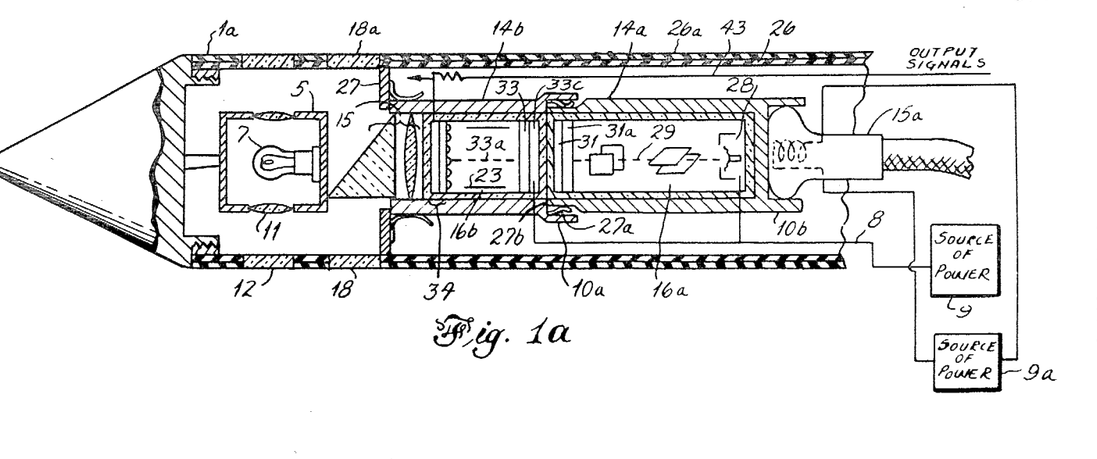
FIGURE 1a shows a modification of the intrascope.

It should be understood that the photocathode or screen 34a may be of photoconductive or photovoltaic type. FIGURES 1A illustrates the photoconductive type of the photocathode 34A which comprises a light-transparent conducting layer 34a and a photoconductive layer 34C. The photoconductive layer 34C may be of various sulphides, selenides, especially those containing zinc, cadmium or lead, of oxides such as PbO, CaO or ZnO, of tellurides, antimonides, especially containing indium or of compounds of titanium, such as barium or lead titanates. In some cases a mixture of two or more of aforesaid elements will produce better results. In some cases various activators like Cu or S are added to the layer 34C to modify its characteristics. It should be understood that the photoconductive layer 34C may be an evaporated layer, sintered layer, a layer embedded in a plastic, a crystalline layer, a mosaic of crystals or a single crystal. In some cases a light-transparent dielectric layer may be provided between the layer 34a and 34C. The photocathode 34A may be of convex shape or of a planar shape. Furthermore, the layer 34a may be mounted on the side of the photoconductive layer 34C which faces the electron beam. In addition the conducting layer 34a should be in some cases connected to a source of an electrical potential to provide a biasing electrical field across the layer 34C. The remaining parts of the tube 16B are the same as of the tube 16b.

The light image of the examined part is projected by the optical system on the photocathode 34 of the vacuum tube 16b. The light image produces emission of photoelectrons from the layer 34c. As a result, a positive charge image having the pattern of said light image is left on the photoemissive mosaic 34c. Both vacuum tubes 16a and 16b are held in apposition to each other and in such a manner that the fluorescent screen 31 of the vacuum tube 16a is adjacent to the photoemissive electrode 33 of the tube 16b. The scanning electron beam 29 impinging on the fluorescent screen 31 produces a light spot at each point of its impingement. The scanning illumination excites the photoemissive electrode 33 and produces thereby a fine scanning beam of photoelectrons 33a. The photoelectron beam 33a is of the scanning type because it is produced by the scanning electron beam 29. The photoelectron beam 33a may be further focused by electrostatic fields 23. In this construction it is preferable to use focusing fields because the separation of the fluorescent screen 31 from the photoemissive electrode 33 by the thickness of the wall of the vacuum tubes 16 and 16b causes certain unsharpness of the photoelectron beam 33. The electron beam 33a may be of high velocity such as used in the iconoscope type of television pickup tubes or may be of a slow velocity. In this embodiment of my invention, I use the slow scanning electron beam. It is to be understood, however, that the fast scanning electron beam may be used in my invention as well. The electron beam 33a scanning across the charge image stored in the mosaic 34c converts said image into electrical signals which appear at the signal plate 34a. These electrical signals can be converted into video signals over the resistance in the manner well-known in the art. The video signals are transmitted by the flexible coaxial cable 43 from the intrascope within the examined part of the video amplifiers 43a outside of said part. The amplified signals are transmitted from the amplifiers to the viewing tube of kinescope type 37 and are reconstructed therein into the visible image representing the image of the examined part. The viewing tube may be of kinescope type and does not have to be described in detail as it is well-known in the art. The examined part will appear on the fluorescent screen 37a of the viewing tube where it can be inspected by many examiners. Transmission of the image from the amplifier 43a to the viewing tube can be done by coaxial cable 43 or by high frequency waves. The image can be sent, therefore, not only to the immediate but also to the remote receivers or may be transmitted to multiple independent viewing tubes for the benefit of many examiners, which was one of the objectives of this invention. The image on the viewing tube 37 may also be photographed simultaneously with the intrascopic examination in order to make a permanent record, which was another purpose of this invention. It should be understood that the electrical signals from the pickup tube may be fed into various utilization circuits instead of into image reproducing receivers.

The contrast of the reproduced image may be changed, diminished or increased according to the needs of particular examination by using amplifiers provided with variable mμ tubes, or by the use of kinescope in which gamma can be controlled. The signal to noise ratio of this system and therefore the definition of the reproduced image may be improved by using in amplifiers discriminating circuits which reject signals below the predetermined amplitude and eliminate therefore most of the noise signals. The coaxial cable 43 within the examined part may be encased in the above-described means 26 or 26a for inserting intrascope or may be attached to them.

The voltages for the operation of the tubes 16a and 16b are supplied through the flexible electrical wires 8a from the source of the electrical power 9 outside of the examination. In this same way the horizontal and vertical synchronizing circuits, focusing fields and deflecting circuits are supplied with electrical energy from the outside source of power 9. The synchronizing circuits are not described in detail as they are well-known in the art and it is believed they would only complicate the drawings. In some cases the coaxial cable may be outside of said inserting means 26 or 26a.

Figures 1A, 1B, 1C, 1D, 3:
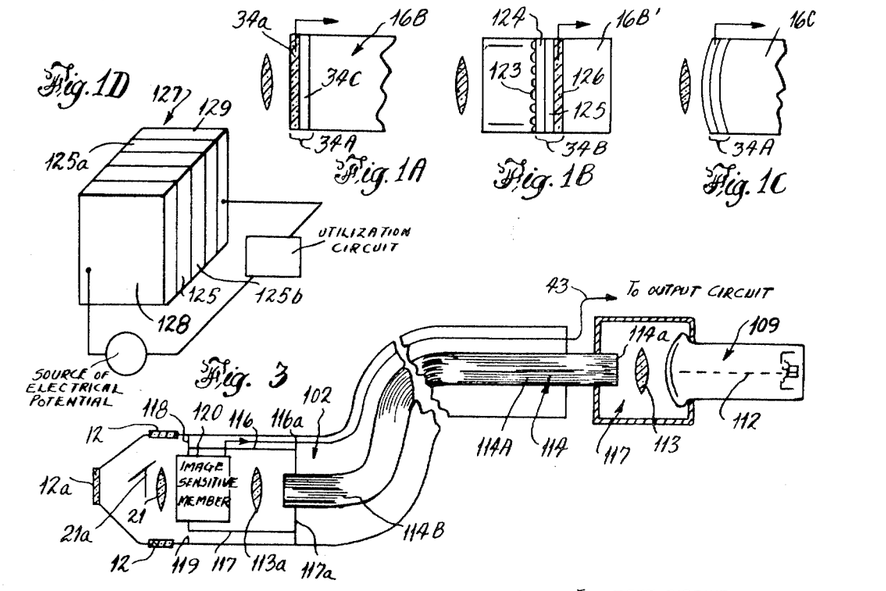
Figure 1B:
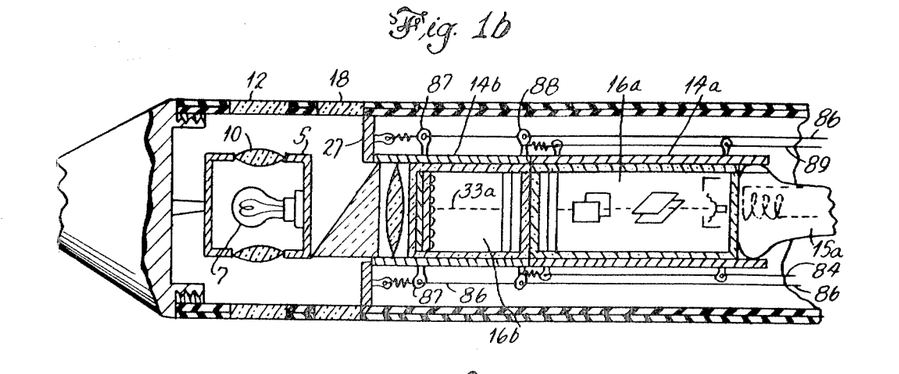

Another modification of the tube 16b is shown in FIGURE 1B. The tube 16B' has a composite photocathode 34B. FIGURE 1B shows a vacuum tube provided with one composite image-sensitive screen. The photocathode or screen 34B has a photoemissive layer 123, a dielectric layer 124, a photoconductive layer 125 and a transparent conducting layer 126. The image of the examined part is formed in the mosaic layer 123. The image sensitive screen 122 is illuminated by the flying spot from the tube 16a through the light transparent layer 126. The scanning illumination changes the conductivity of the layer 125 and converts thereby the electrical pattern stored in layer 123 into successive electrical signals corresponding to the image of the examined part. The electrical signals are conducted to the receivers outside of the examined part where they are reconverted into visible images in the manner well-known in the television art. It should be understood that electrical signals may also be fed into different utilization circuits, such as using an "absorption negative," which are well-known in nondestructive testing in industry.

Another modification of the tube 16b in which a photoconductive photocathode is used instead of a photoemissive photocathode 34 is shown in FIGURE 1C. The tube 16C comprises only photocathode 34A which may be of convex or planar shape. The materials for the photocathode 34A were described above. In some cases the photocathode 34A may have two different photoconductive layers, such as layer 125 and 125a adjacent to each other. The layers 125 and 125a are preferably separated by a light impervious layer.

In some cases the composite photocathode or screen described in FIGURE 1C may have a construction in which both photoemissive and photoconductive layers are used. Such a photocathode will have a mosaic photoemissive layer on the side exposed to the image forming radiation, a photoconductive layer, and a light transparent conducting layer on the side facing the source of scanning illumination. The image of the examined part is received by the mosaic layer and is converted into a charge image. The scanning illumination converts said stored charge image into successive electrical signals which are taken off the conducting layer.

Another embodiment of the image sensitive pickup element is shown in FIGURE 1D. In this embodiment the image sensitive element is not a vacuum tube but a solid screen 127 which comprises two photoconductive layers 125 and 125a and light transparent conducting layers 128 and 129, such as of cadmium, oxide, tin oxide, tin chloride or of noble metals, adjacent to the photoconductive layers on either side of the screen. The image of the examined part is projected on one side of said screen 127 and is converted into an electrical pattern of electrical conductivity changes in the layer 125. The flying light spot conducted by the light image conductor 114 is projected on the opposite side of screen 127, produces an increase of electrical conductivity of the layer 125a, and converts thereby the electrical pattern in layer 125 into successive electrical signals. The electrical signals are conducted to the receivers outside of the examined part and may be reproduced as visible images in the manner well-known in the television art. In addition, the electrical signals may be fed into various utilization circuits and may actuate various devices as it is known in the industrial sorting or testing of materials. In some cases it is preferable to place a light opaque layer 125b between the photoconductive layers 125 and 125a. Furthermore it is advisable to connect the layers 125 and 125a to the terminals of a source of an electrical potential to provide a biasing field across said layers. Suitable photoconductive materials for layer 125 or 125a are selenides as of sulphides of lead, cadmium or tellurium, oxides such as lead oxide or zinc oxide, antimonides, especially indium antimonide, and titanium compounds such as barium or lead titanates. It should be understood that all these materials may be used as evaporated layers, sintered layers, mosaic layers, layers embedded in plastic, single crystals or a mosaic of crystals. The layers 128 and 129 may be continuous or in form of a mesh screen or a grid.

It should be understood that the relative position of the flying spot kinescope such as 16a and of the image sensitive member, such as 16b, 16b' or 127 or any modifications thereof, may be reversed. This means that in some cases the flying spot kinescope instead of being situated proximally in relation to the image sensitive member is now situated distally in relation to the image sensitive member.

The housing 14 containing the television camera can be rotated in its position in the intrascope so that the optical system 15 can be made to face the window 18 or 18a and to "see" thereby various areas of the circumference of the examined part. The rotation of the camera can be accomplished by means of a pusher 15a which fits into extensions 10b of the box 14. The rotation of the camera may be preferable in some cases to the rotation of the whole intrascope which allows the accomplishment of the same purpose.

The main rigid portion of the flexible intrascope is the television camera 16. Therefore the shorter the television camera is the easier it will be for the intrascope to pass through sharply angulated or curved passages. One of the advantages of the novel pickup tube 16 is that it makes it possible to break up the smallest pickup tube into two component parts such as tubes 16a and 16b and introduce each of said tubes into the examined part separately, reducing thereby considerably the rigid portion of the intrascope which is due to the television camera, as shown in FIGURE 1a.

To accomplish these objectives, the flexible intrascope 1a is introduced first into the examined part while containing only the box 5 housing the light source 7. Inside of the intrascope 1a, proximally to the box 5, there is a ring-like partition which serves as a stop 27 for the pickup tube 16b which is to be introduced later. It is obvious that the shape of this stop may vary. The rest of the intrascope 1a is empty. The intrascope 1a is introduced first into the examined part. As the only rigid part in the intrascope is now the box 5, which is very small, this intrascope can easily pass even through very narrow and curved passages. After the intrascope 1a has been introduced into the examined part for a desired distance, which can be read easily on the markings provided on the outside wall of the intrascope, the next step begins. Now the housing box 14b, in which the vacuum pickup tube 16b is mounted, is introduced into the intrascope. The housing box 14b is pushed into the intrascope until it reaches the stop 27, which can be also ascertained by the X-ray control. The box 14b may be held against the stop 27 by spring extensions 27a on said stop 27. The housing box 14b may be pushed into its position by a flexible elastic guide 15a, which is fitted into the proximal end of the housing box 14b. For this purpose the housing box 14b is provided with a ring-like extension 10a at its base as shown in FIGURE 1a, which has spring-like properties. The head of the flexible pusher 15a fits into this extension and is kept in position by it. The flexible pusher 15a may also be provided with electrical coils 6a at its distal end, which is adjacent to the element to be introduced into the intrascope. The coils 6a are connected to the source of electrical power situated outside of the examined part. In this way the head of the pusher may be given electromagnetic properties by closing the circuit, energizing the said coils 6a. The pusher 15a will be held, therefore, in the elements to be introduced into the intrascope, such as boxes 14a, 14b or the optical system 15, not only by the mechanical pressure of the extensions 10a or 10b but by magnetic attraction as well. When the pusher 15a is to be withdrawn, the current supplying the coils 6a is shut off. To facilitate the guiding of the box 14b into the intrascope, a set of threads 86 may be used, which are at one end attached to the stop 27 and which are threaded through the perforations in the extensions 87 of the house box 14b. After the box 14b has been introduced into its proper position, the intrascope, the pusher 15a, is removed. Another set of threads 89 is attached to the extensions 88 in the housing unit 14b and serves to pull out said box 14b to the exterior of the examined part when the examination is finished. This arrangement is shown in FIGURE 1b.

The housing box may be omitted in some cases and the tube 16b may be introduced into the intrascope without any housing and will be held in position by the same means as described above for holding the box 14b.

After the box 14b with the tube 16b has been introduced, the box 14a housing the tube 16a is introduced now into the intrascope in a similar manner as was described above. Both boxes 14b and 14a have openings at their proximal and distal ends respectively, which makes it possible to bring the fluorescent screen 31 of the tube 16a in close apposition to the photoemissive electrode 33 in the tube 16b. The boxes 14a and 14b are provided with mechanical means for securing a good contact of the proximal end of the tube 16b with the distal end of the tube 16a. One way of providing such a contact is to make the compartment 14a fit inside of the spring-like flange 27a at the proximal end of the compartment 14b. The housing box 14a contains vacuum tube 16a which has been described above. The housing box 14a is provided with spring-like extensions 10b which serve to accommodate the head of the pushing guide 15a.

The housing box 14a is pushed into the intrascope until it reaches the position of the stop 27b. This can also be checked by the X-ray control. The stop 27b is so situated that when the housing box 14a reaches it, the tubes 16a and 16b will be in apposition to each other. In some cases flexible coils, which can be converted into magnets by passing through them an alternating current from an outside source of electrical power, may be provided on the stops 27 and 27b or at extensions 10a or 10b of the intrascope to help the positioning of boxes 14a and 14b. In this way the rigid portion of the intrascope, which has to pass through a narrow passage or acute curvature, is now only a fraction of the rigid part of intrascopes, which use even the smallest pickup tube of conventional type. This represents an important improvement as it makes it possible to introduce the intrascope into parts which were not accessible previously to examination. In case the size of the pickup tube is not of critical importance, one of standard television tubes, after being miniaturized, may be used as well.

The size of the kinescope tube 16a may be reduced considerably if it can be operated at a low voltage and produce at said low voltage sufficient illumination of the electrode 33. One way of accomplishing this purpose is disclosed in my U.S. Patent No. 2,586,391 which discloses amplifying screen consisting of a light reflecting layer, a fluorescent layer, a light transparent separating layer and a photoemissive layer. Said screen is disposed in the kinescope between the electron gun and the fluorescent image reproducing screen. The same objective may also be obtained by using between the electron gun and the image reproducing screen a secondary electron emissive electrode, which may be of a solid type or preferably of mesh screen, is of material having a high secondary electron emission ratio, such as Ag:Mg or it may have deposited on a mesh screen a layer of a highly electron emissive material, such as CsO or of CaSb. As 6–10 electrons may be emitted by said screen for each incident electron, the voltage of the kinescope may be considerably reduced. The electron-optical field between said secondary electron-emissive electrode and the fluorescent screen 31 will focus the divergent secondary electrons into fine beams so that the definition of the image will not be markedly impaired.

Figure 2:
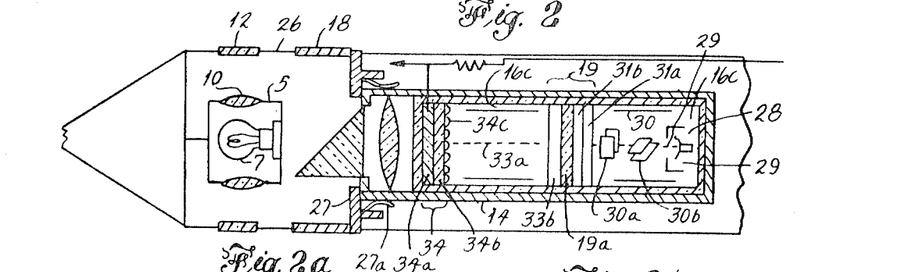
FIGURE 2 shows the intrascope provided with a modification of the television camera.

There are certain drawbacks in the intrascope 1 or 1a described above. The separation of the fluorescent screen 31 from the photoemissive electrode 33 by the thickness of the wall of the vacuum tube 16a and of the tube 16b causes some unsharpness of the photoelectron beam 33a. This unsharpness is due to diffusion of light spot from fluorescent screen 31 as it travels through distance equal to the thickness of the walls of the tubes 16a and 16b. By the time the light spot reaches the photoemissive electrode 33, it has spread so that it cannot produce any more a fine photoelectron beam. Besides the fluorescent light spot suffers in the glass walls of the tubes 16a and 16b multiple internal reflections so that part of the fluorescent light will be scattered and will strike different separated areas of the electrode 33 reducing thereby further definition and contrast. Furthermore, it is not always possible to introduce component parts of intrascope separately as was described before. In some examinations, the time available is very limited so that intrascope must be ready for the use as soon as possible. In such cases, another modification of my invention is more suitable. This embodiment 1b of the intrascope is shown in FIGURE 2. In this embodiment of invention, the tubes 16a and 16b are replaced by one vacuum tube 16c having a composite target 19 described below. The fluorescent layer 31b of phosphors described above is deposited on one side of a very thin light transparent separating partition 19a, whereas the photoemissive layer 33b of one of the materials described above is deposited on the opposite side of said partition. The partition 19a may be of mica, glass, or of a suitable plastic and should preferably be very thin, such as of the order of a fraction of millimeter in order not to impair definition of images produced by the said television pickup tube. Better results may be obtained if the partition 19a is conductive. This may be accomplished by using for the partition a conductive material or by coating the partition on the side, which supports the photoemissive layer, with a light transparent conducting layer, such as is known in the trade under the name of "Nesa," indium compounds or of cadmium compounds. In some cases the composite target 19 may be deposited on the photocathode 34 instead of being supported by the side walls of said pickup tube. In this event the separating layer 19a may preferably be reduced to the thickness of a fraction of one micron.

Figure 2A:
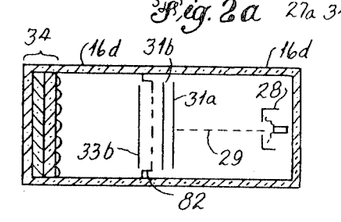
FIGURES 2a, 2b and 2c represent modifications of the television camera.
Figure 2B:
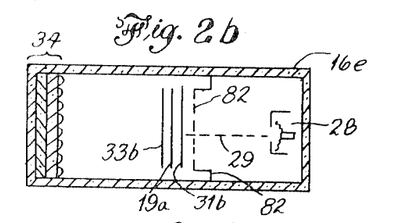
Figures 2C, 2D:
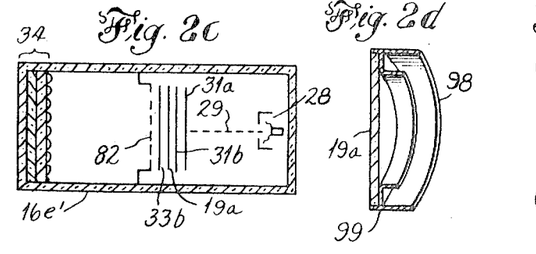
FIGURES 2d and 2e represent a cross-sectional perspective view of supporting element for the composite target in the television camera.
Figure 2E:
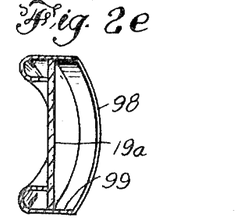

The partition 19a may be placed in its position within the tube 16c by means of a metallic ring 98 having a flange 99 which supports the partition, whereas the ring itself is attached to the walls of the tube. The cross-sectional perspective view of the ring 98 and partition 19a is shown in FIGURES 2d and 2e. Instead of a metallic ring 98, the transparent separating layer 19a, the fluorescent layer 31 and photoemissive layer 33b may also be supported by the mesh screen of conducting or insulating material 82 as shown in the pickup tube 16d and 16e and 16e' illustrated in FIGURES 2a, 2b and 2c. Instead of a mesh screen a supporting layer of continuous type may be used and may be made of one of the materials used for the separating layer 19a which are either light transparent or electron transparent. In some cases it is preferable to make the fluorescent layer 31b and the photoemissive layer 33b of semispherical curved shape. In some cases the separating partition 19a may be omitted and the fluorescent layer 31b and photoemissive electrode 33b are both supported by the mesh screen 82 or by a supporting element of continuous type 19a without any separating layer. This arrangement is possible only in cases in which the photoemissive layer 33b and fluorescent layer 31b do not inactivate each other and the photoemissive layer 33b is conductive. The other elements of the novel pickup tubes 16c, 16d and 16e are the same as described above. At one end of the tube 16c there is disposed an electron gun 28 which produces an electron beam 29. The electron beam 29 is focused by electrostatic field 30 and is deflected by electrostatic plates 30a and 30b in two perpendicular to each other planes. The electrostatic plates are energized by signals from saw-tooth generators 32 which are situated outside of the examined part. The generators 32 are connected with electrostatic plates 30a and 30b by means of flexible wires. In this way the electron beam 29 is made to scan the fluorescent layer 31a of the composite target 19 in a regular television raster. The fluorescent layer 31b may also be provided with an electron transparent metallic conducting backing layer 31a such as of aluminum. The fluorescent scanning light spot produces a scanning photoelectron beam from the photoemissive electrode 33b which may be of CsOAg or of caesium, lithium or rubidium on antimony, arsenic or bismuth. At the opposite end of the vacuum tube 16c there is provided photocathode 34 which consists of a light transparent signal palte 34a, a light transparent insulating layer 34b and of a photoemissive mosaic 34c. The signal plate 34a may be a thin transparent layer of metal or other conducting material. The insulating layer 34b may be of mica or other transparent dielectric material and photoemissive mosaic 34c may be of CsOAg or of caesium, rubidium or lithium on antimony, arsenic or bismuth, as was described above.

In some cases it is preferable to focus the scanning electron beam 33a on the photocathode 34. The focusing has to be done by means of electrostatic field 30a. In such event the photocathode 34 or its photoemissive mosaic 34c should be preferably of curved semispherical shape. The rest of the operation of the intrascope 1b using the television camera 16c is the same as was described above. A considerable improvement in definition of reproduced images may be achieved by making the fluorescent screen 31 of grainless phosphors.

The housing box may be omitted in some cases and the television tube may be introduced into the intrascope without any housing and will be held then in position by the same means as were described above for holding the housing box.

In another embodiment of invention, illustrated in FIG. 3, the kinescope 109 which produces the flying spot illumination of the image sensitive member 120, which may have the construction of tube 16b, or of screen 127, or of any modifications thereof, is disposed outside of the examined part and has, therefore, no limitations any longer as to its size or flexibility. The kinescope 109 has a similar construction as the flying spot kinescope 16a described above. It should be understood, however, that it can be now of magnetic or electrostatic type as it is not limited any more as to size. The flying spot light produced by the electron beam 112 is projected by a suitable optical system 113 on a flexible novel light conductor 114.

The image conductor 114 consists of multiple fibers of material having a high refractive index such as quartz, rutile or special plastics. In many applications the image conductor must be flexible and easily malleable. In such cases, acrylic plastics, such as Lucite or polystyrenes may be used. Especially Lucite is suitable for this purpose because it causes smaller losses of conducted light than other materials. Lucite and other above-mentioned materials characterized by a high refractive index have the property of internal reflection of the light conducted by them. Such materials cannot conduct a whole image as such but they can conduct well a light signal, which means an image point. The size of the image point I found is determined by the diameter of a single conducting fiber 114A. In my image conductor I assembled a bundle of such fibers which form a mosaic-like end-faces and which, therefore, can conduct a plurality of image points. All these image points will reproduce at the other end-face of the image conductor the original image, provided that the ends of image conducting fibers remain in their original spatial relationship. Each fiber 114A should have, as was explained above, a diameter corresponding to the size of one image point. The diameter of 0.1 millimeter is well suitable for the purposes of my invention. In order to conduct an image of an area, e.g., of one square centimeter, we must have many fibers, the number of fibers being dependent on the resolution of reproduced image that we desire. If the resolution of the conducted image should be four lines per millimeter, and if the image is of one square centimeter in size, we will need 40 fibers of 0.25 millimeter in diameter. The light conducting fibers should be polished on their external surface very exactly. Each of them must also be coated with a very thin light opaque layer 114B to prevent spreading of light from one fiber to another. I found that without said light-impervious coating, the image will be destroyed by leakage of light from one tube to another. The light opaqued layer should have a lower index of refraction than the light conducting fiber itself. Such a coating may have a thickness of only a few microns. I found a great improvement of flexibility of the light conductor 114 can be obtained by having the light conducting fibers 114A glued together only at their end-faces 114a and 114b. This is a very important feature of my device because the main requirement from the light conductor 114 is its flexibility and malleability. If the fibers 114A are glued together along their entire length, the flexibility and malleability is so much reduced that it may not be possible to use it in many examinations in which the walls or passages are fragile and may be damaged by a rigid instrument. I found unexpectedly that having the conducting fibers 114A free along their path between the end-faces will not cause any deterioration of the conducted image. I found that in spite of the fact that fibers between their end-surfaces were freely movable, there was no blurring of the conducted image. It must be understood, however, that the fibers 114A at both end-faces of the conductor 114 must rigidly maintain their spatial relationship. Another important feature of this construction is that the diameter of the light conductor 114 can be now increased because no space consuming binder or glue is present between the fibers 114A except at their end-faces. Instead of using the binder at the end-faces of fibers 114, they may also be held together at their end-faces by a fine mesh screen. Each fiber is threaded through one opening of said mesh screen and is being held by said screen in constant position. It may be added that smaller loss of light may be obtained if the fibers 114A are hollow inside instead of being solid.

The number of fibers that can be used in many examinations will be limited by the diameter of the passages through which my intrascope has to pass. As in many situations, the channel may be only 1–2 cm. wide, it will be impossible to use a great number of fibers or a single rod of a large diameter. I succeeded in overcoming this limitation by using in combination the light conductor 114 with a demagnifying optical system 140. By the use of the demagnifying optical system I can reduce the examined field to the diameter of the image conductor 114. If the optical system will demagnify the image five times, I can examine the field having 25 cm.² with the image conductor having the diameter of only 1 cm.². This combination of a light conductor with an optical system represents a very important feature of my invention, as it is not always practical or feasible to limit the examined field only to the diameter of the image conductor.

The light image conductor 114 may be introduced into examined part simultaneously with the intrascope. In some cases it is preferable to introduce by intrascope first and then insert the image conductor into the intrascope. In some cases the optical system 113a or 140 may be attached to the end-face 114b of the image conductor to make one unit.

In some cases it is possible to use a light conductor 114c which consists of a single large rod 114c instead of plural fibers 114A, as was described above. The material for the "single rod conductor" may be flexible acrylic plastics, polystyrenes or Lucite. The light conducting rod must be coated with a light-impervious layer 114B of material having a lower index of refraction than the rod itself, such as carbon, graphite or aluminum, except on the surfaces which serve to admit the light or to let the light escape from the conductor. The single rod conductor cannot conduct an image but only successive light signals.

As shown in FIGURE 3 the proximal end 114a of the light conductor 114 must be maintained in a fixed spatial relationship with the flying spot kinescope 109 by mechanical means which may be constructed in the form of a perforated rigid member 117. The light conductor 114 passes through the aperture of said member and is attached thereto. The member 117 is rigidly attached to the kinescope 109 and establishes thereby fixed relationship between the proximal end 114a of conductor and the kinescope 109. The light conductor 114 directs the successive light spots produced by the flying spot kinescope into the endoscope 115. The scanning light spots emerging from the distal end 114b of the conductor 114 are focused by a suitable optical system 113a on the image sensitive member 120. The impingement of scanning illumination converts the electrical pattern which represents the image of the examined part and which is stored in said member 120 into successive electrical signals. The electrical signals are conducted to the outside of the examined part by wires 43 or by printed circuits and are fed into receivers to reproduce the image. In addition, electrical signals may be used to activate various circuits or devices used for industrial sorting and testing. The distal end 114b of the light conductor 114 must also be maintained in a fixed position in relation to the image sensitive member 120, which may be of any type described above, such as tube 16b or 16B' or 16c or screen 127, when the image of the examined part is transmitted. The rigid plates or rods 116 and 117 with rigid extensions 116a and 117a, to which the distal end 114b of the light conductor is attached, serve to maintain the distal end of the light conductor in a fixed position. I found furthermore that the endoscope 102 will not operate properly if the distal end 114 of the light conductor 114 and the image sensitive element 120 are not maintained in a fixed position. The rigid rods 118 and 119 connected to the image pickup element 120 serve for this purpose. It should be understood that instead of rods, a rigid box, which incloses both the element 120 and the end 114b of the conductor, will provide their immobilization as well. The remaining parts of the endoscope 102 may be the same as described above.

It should be understood that the image sensitive element 120 may have many embodiments, all of which come within the scope of this invention. The pickup element 120 may have flexible sidewalls in some sections or through-out the whole length of sidewalls. Furthermore, element 120 may have completely rigid sidewalls when used in combination with a light conductor 114. The image pickup element 120 may be of photoemissive type or may be of photoconductive type or of photovoltaic type and may comprise any material described above.

Figure 4:
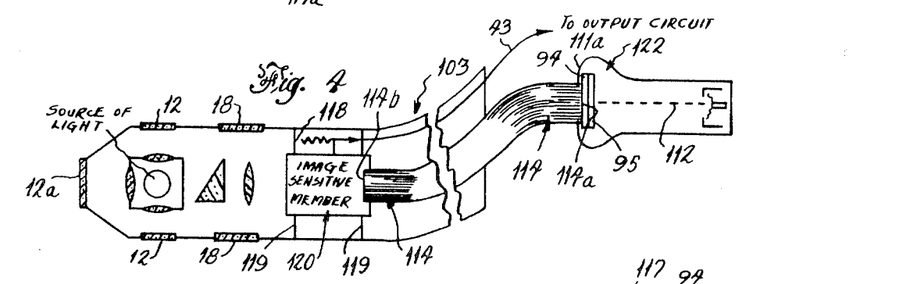

Another improvement of the endoscope is shown in FIG. 4. I found that the loss of light conducted by the conductor 114 becomes very high if the conductor extends over the length of a few feet. It is necessary, therefore, to utilize all the light available from the flying spot kinescope 109. The optical system 113 or 113a in the fastest form still causes a loss of at least 90% of useful light. I found, therefore, that in examinations of remote parts, it was necessary to eliminate the optical system 113 or 113a or both. FIG. 4 shows flying spot kinescope 122, in which all of the endwall 111a or a part of said endwall is replaced by the light conductor 114, which may be of materials described above, but preferably should be of quartz. The proximal end-face 114a of the conductor 114 may be flush with the rest of the endwall of the kinescope 122 or may extend inside of the kinescope 122. The fluorescent screen 94 is deposited on said end-face 114a. This construction eliminates the optical system and in spite of it, there is no loss of sharpness of the scanning light spot, because of a close apposition of the fluorescent screen 94 and of the light conductor 114.

A similar construction is used in the distal end 114b of the conductor whereby the distal end 114b enters into image sensitive member 120 to establish an optical contact with the image sensitive screen, such as 34, 34A, 34B disposed in said image sensitive member.

The same construction may be applied advantageously to the embodiment of invention shown in FIG. 1D whereby the distal end 114 of the light conductor 114 will be in contact with the screen 127.

A rotating mirror 21a may be used in addition to lens 21 to receive the image through various windows in all embodiments of endoscopes. The remaining parts of the endoscope 103 may be the same as described above.

It should be understood that in examinations in which the definition of the image is not important, the image conductor 114 may be placed in contact with the endwall of the flying spot kinescope or with the endwall of the image sensitive member either of television type or of image reproducing type, without penetrating into such a vacuum tube or photocell.

Figure 5:
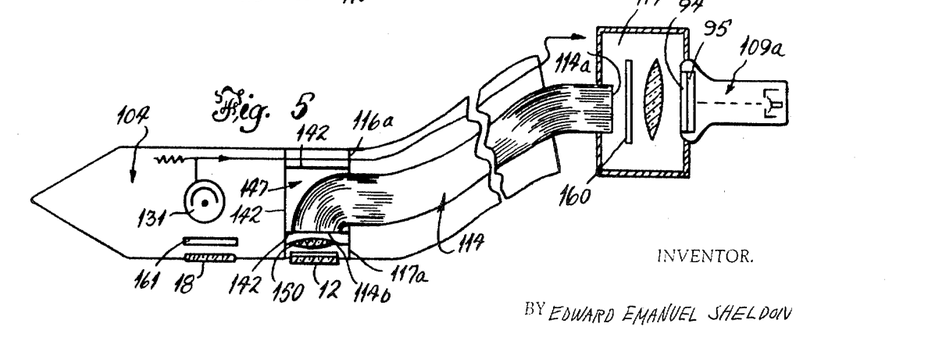

In another embodiment of invention the flying light spot tube is used to produce a scanning illumination of the examined body instead of the scanning illumination of the image sensitive element, as was described above, and is disposed outside of the examined body. This endoscope 104 is shown in FIG. 5. The kinescope 109a may be of any of the constructions described above, such as the tube 16a, 109 or 122. The light conductor 114 may be the same as was described above. The flying spot is projected by the optical system 150 onto the examined part.

The optical system 150 is an important feature of this invention. As the diameter of the image conductor 114 is limited by the narrow passages, the field of the examined body, which may be scanned through the image conductor, is necessarily limited. By using, however, an optical system 150, which produces five-fold enlargement, it is possible now to cover the field of the examined part, which is five times larger. This feature proved to be very important in some examinations.

The reflected light spot is admitted through the window 18 to the image sensitive element 131, which in this construction may be in the form of a multiplier phototube. In some cases the solid state photoconductive devices, such as photodiodes or phototransistors, may be used as an image sensitive element instead of a vacuum tube 131. It should be understood that the multiplier phototubes, such as 131, photodiodes or photocells, such as 127, cannot produce an image without the use of a scanning illumination for forming a plurality of successive image points. The use of an ordinary field illumination in combination with phototubes or photocells will produce only signals but not images.

The reflected successive light spots are converted by the element 131 into successive electrical signals. Electrical signals are conducted outside of the examined part and may be reconverted into visible images, as is well-known in television art. It should be understood that the electrical signals may be also fed into various utilization circuits provided with "absorption negatives" or other mechanism used for sorting and testing materials. I found that an essential feature of this embodiment of the endoscope is the maintenance of a fixed spatial relationship between the flying spot kinescope 109a and the proximal end 114a of the light conductor 114. The distal end 114b of the light conductor 114 also must be immobilized. The immobilization of the kinescope 109 and of the proximal end 114a of the light conductor was described above. The fixed spatial relationship between the distal end 114d of the light conductor and window 12 may be provided by rigid rods 116a and 117a, or by enclosing the distal end of the light conductor in a rigid light impervious box 147.

Furthermore, if no such box is used, there must be provided light impervious partitions 142 which prevent the light from the light image conductor 114 to reach the image sensitive element 131 before being modulated and reflected by the examined part.

In some cases the flying spot kinescope 109 may be mounted inside of the endoscope or may be introduced inside of the examined body or object but will remain outside of the endoscope.

Figure 6A:
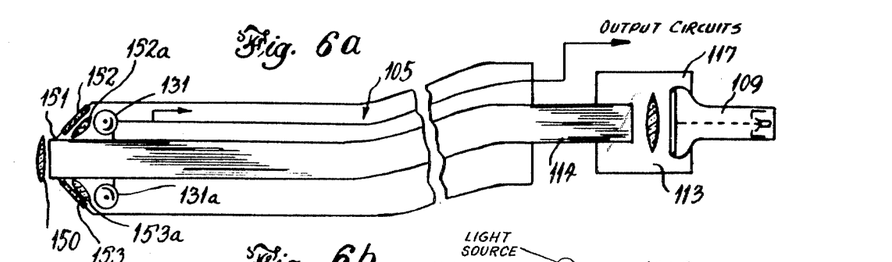
FIGURES 6a, 6b, 6c and 6d show modifications of the novel endoscope with image conductor.

In some cases the scanning illumination of the examined part is directed through the distal end of the endoscope 105 as it is shown in FIG. 6a. The light from the light conductor 114, which may extend beyond the endoscope through the opening 151, is focused on the examined part by the optical system 150. The reflected light is admitted into endoscope through windows 152 or 153 and is focused by lenses 152a or 153a on the image sensitive member 131 or 131a or both.

Figure 7:
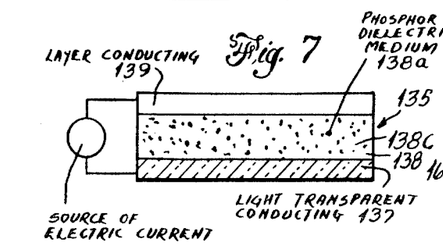
FIGURE 7 shows a novel flexible light source.

Another important improvement of all the endoscopes described above is the use of a flexible source of illumination instead of conventional, rigid bulbs or lamps. The flexible light source 135 is illustrated in FIG. 7. The light source 135 comprises fluorescent layer 138, a light transparent conducting layer 137, another light transparent layer conducting layer 139. One of conducting layers 137 and 139 may be light opaque instead of being light transparent. The layers 137 or 139 may be continuous or preferably in the form of a fine mesh or grid. The layers 137 and 139 are connected to an extraneous source of A.-C. or D.-C. electrical potential, preferably, however, of A.-C. type. The electrical potential of 100 volts–1000 volts and frequency of 50 cycles per second up to 1000 cycles per second for A.-C. type are sufficient to provide 10-ft. candles of illumination without producing any heat. This feature is of great importance in examination of the living bodies where the heat generated by conventional filament type of bulbs may be injurious to the adjacent tissues. The fluorescent material is embedded in a dielectric medium 138c. This dielectric medium must be of a flexible and light transparent material. Some of materials described above were found very suitable for this purpose. In particular, polyesters, such as Mylar or Cronar, silicones or terepthalates, provide to be suitable for the purposes of this invention.

The luminescent materials used for the layer 138 are sulphides or selenides activated with copper or any other phosphors which have electroluminescent properties. The flexible light source 135 may be made as a thin panel and may be disposed on the sidewalls or on the endwall of the endoscope.

The length of the flying spot kinescope 16a, or any of its modifications is an important factor in the construction of endoscopes. The rigid part of the flying spot tube is due to the electron gun 28. Shortening of the electron gun would help therefore to reduce the rigid part of the flying spot tube. In some cases it is possible to image the source 163 of the electron beam on the fluorescent screen instead of imaging the cross-over of the electron beam on the fluorescent screen 31 or 94. This will allow shortening of the electron gun and thereby shortening of the tube 16a or 109. Also construction of the electron gun known as Wehnelt cylinder will permit reducing of the length of the electron gun. The electrostatic focusing field is provided in Wehnelt cylinder by the electrode adjacent to the filament of the electron gun.

Figure 8:
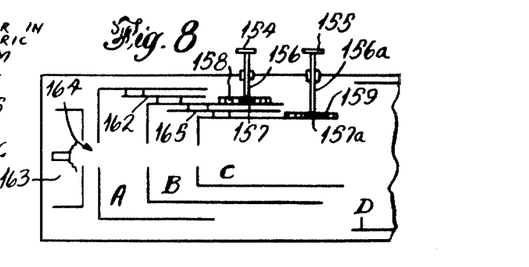
FIGURE 8 shows a novel vacuum tube having a telescopic electron gun.

In cases in which a small electron beam is necessary for a good definition of images, it is necessary to use a two-lens electron gun 164, which is shown in FIG. 8. Such a gun comprises filament 163 for emission of electrons, the first focusing electrode A, the first anode B, the second focusing electrode C and the second anode D, which may have the form of a conductive coating on the wall of the tube. This construction results in a longer electron gun than the one described above. In order to shorten this electron gun 164 without sacrificing sharpness of the electron beam, the members C and B are made movable on tracks or slide channels 162 and 165, so that they may be telescoped into each other before the insertion of the endoscope into the examined part. The nobs 154 and 155 serve to move the electrodes B and C. Racks 158 and 159 are secured on the outside wall of electrodes B and C respectively. Pinions 157 and 157a are mounted on shafts 156 and 156a respectively. The shafts 156 and 156a extend beyond the sidewall of the tube and are rotatable by knobs 154 and 155. The telescoping of the electrodes B and C will cause a considerable reduction of the length of the electron gun which was the purpose of this invention.

Another improvement of the endoscope is the use of the flying spot tube, which has instead of the electron gun only an electron emitter. The electron beam produced by the electron emitting source is injected along the edge of the tube and travels to the opposite endwall of said tube which houses the fluorescent screen 94. A plurality of transparent deflecting plates is mounted in front of fluorescent screen 94 and serves to direct the electron beam to successive points on the fluorescent screen to produce thereby a luminescent raster for scanning illumination. This embodiment of the invention allows shortening of flying spot tube, which is of great importance to the endoscope.

It was explained above that the light conductor of a single rod type cannot be used for conducting or transmitting images. I found, however, that it is possible to use a single rod light conductor for transmission of images by a device illustrated in FIG. 6d. In this embodiment of invention the source of scanning illumination, such as, e.g., the flying spot kinescope 16a or 109 illuminates in a scanning manner the examined part and produced successive image points of the examined part. Each of said image points is projected successively on the single rod light conductor 114C which, as explained above, can conduct only a single light signal, which means a single image point. The successive light signals are fed into phototube 131, which may be disposed inside the examined or outside of the examined part. The phototube is preferably a vacuum tube of multiplier type. In some examinations, a photoconductive photocell or a junction type of a photocell may be used for this purpose. The phototube 131 converts successive light signals into successive electrical signals. The electrical signals are fed into an image reproducing device, such as, e.g., kinescope 16A. The kinescopes 16a and 16A are connected by synchronizing circuits which are well-known in the television art. Therefore, each image point produced by kinescope 16a will appear on the fluorescent screen of the kinescope 16A in a proper spatial relationship. If all image points will arrive in a rapid succession and in a proper spatial distribution, I found that a complete image of the examined part will be reproduced in kinescope 16A in spite of using a single rod conductor. The remaining parts of this endoscope may be the same as was described above.

Figure 6B:
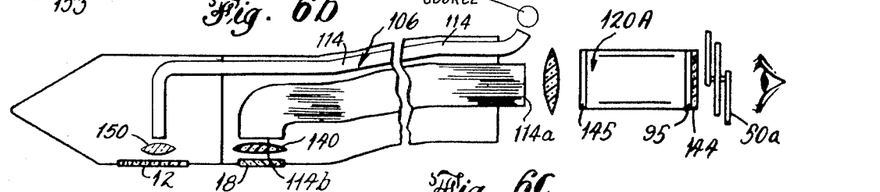
Figure 6C:
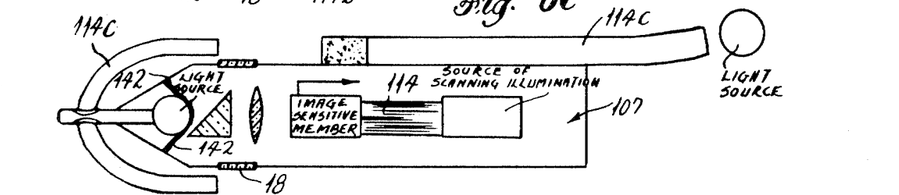
Figure 6D:
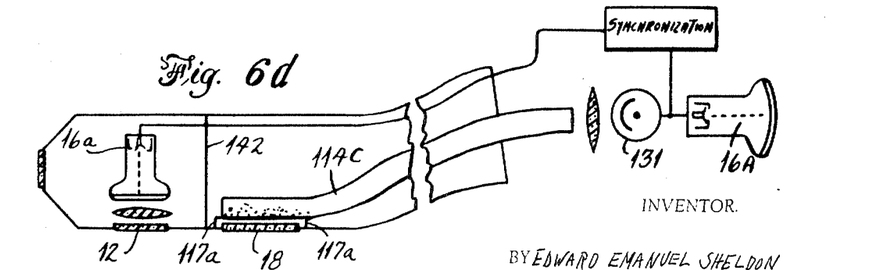

Another advantage of this embodiment resides in discovery that if a single rod conductor has one of its side surfaces exposed, which means abraded and uncoated, it will be able to pick up light signals produced by kinescope 16a along its entire exposed surface. This will solve the problem of examination of large fields, as we will not be limited any more to the field which has the size of the end-face of the light conductor.

In some cases it is preferable to have the image sensitive member outside of the examined body. The endoscope 106 which represents this embodiment of the invention is illustrated in FIG. 6b. The endoscope 106 has light source, which may be of conventional type, or in the form of a flexible electro-luminescent lamp shown in FIG. 7. The light source illuminates the examined part through window 12. It should be understood that the light source may also be disposed outside the endoscope and this applies to all embodiments of the invention. The image of the examined part is admitted to the endoscope through window 18 and is focused on the image conductor 114 which comprises a plurality of light conducting fibers. The conducted image emerges from the conductor 114 outside of the examined part or outside of the examined body and may be viewed by the examiner. In some examinations the emerging image has a very low brightness. It is advisable in such cases to direct the image to the image amplifying tube 120A or to a television camera. The image reproducing tube 120A has a photoelectric photocathode 145 which receives the conducted image and converts same into an electron beam 143 and an image reproducing fluorescent screen 44 which reconverts the electron beam into an intensified visible image.

In some cases the end-face of the image conductor should be preferably disposed within the image amplifying tube 120A, or within the television pickup tube in a similar manner as was described in FIG. 4. This endoscope may be used for producing color images of the examined part, as was described above. The use of rotating color filters 50 and 50a is one way of producing color images.

In some examinations it is preferable to have the image sensitive member and the source of scanning illumination both to be within the examined part. The endoscope 107, which represents this embodiment of invention, is shown in FIG. 6c. The scanning illumination may sometimes be delivered to the image sensitive member by an optical system, but I found that it is preferable to use the image conductor 114 for this purpose as relative positions of aforesaid members cannot be predicted and optical systems fail.

FIGURE 6c shows a modification of the endoscope in which the illumination is provided by a conventional source of light, such as electrical bulb 7, or by electro-luminescent source of light 135. This illumination is piped into the examined part through a flexible conductor 114c. The light conductor is in the form of a single rod as it does not serve to conduct an image but only illumination. The flexible light conductor 114c may be situated inside of the endoscope of outside of the endoscope. If it is outside of the endoscope it may be moved towards the wall of the examined part by shortening the thread or wire attached to its distal end. In this way the light may be brought closer to the examined part or may be even inserted into a narrow channel adjacent to the examined part which is not accessible to the endoscope itself.

It should be understood that the endoscope shown in FIG. 6b may have the image tube 120A or the image sensitive member, such as 16b and its modifications, 120 or 127, or a television pickup tube disposed inside of the examined body. In such a case the end-face 114a of the image conductor is also within the examined body and may be inside of the endoscope or may be outside of the endoscope. The operation of such device is as follows: the end-face 114b receives the image of the examined part through window 18. The image projected on the end-face 114b may be demagnified by the optical system 140 to reduce the size of the image to the size of the cross-section of the image conductor 114. The image emerging at the proximal end-face 114a may be projected in the image sensitive member, such as 16b or its modifications described above, 120 or 127, or on a television pickup tube, and will be thereby connected into electrical signals, as was described above. The electrical signals may be led to the outside of the examined body by a coaxial cable, as was explained above. The television pickup tube may be of photoemissive type, photoconductive type, or photovoltaic type, and may use a fast or slow scanning electron beam. The novelty of the combination of the image conductor with a television system resides in the ability of the intrascope provided with this combination to penetrate into locations which are inaccessible to television pickup system. The television pickup system can then transmit the image to the outside of the examined body and it can do it regardless of the distance between the television tube and the outside. The image conductor on the other hand is limited in its ability to conduct an image for longer distance because of prohibitive loss of light.

I found that in some cases the combination of two different colors of illumination of the examined part allows the production of the image of pathological lesions in a color which was characteristic of a disease, facilitating thereby diagnosis. For this purpose an additional light source may be placed either outside of the endoscope or inside of the endoscope. If it is placed inside of the endoscope it may be piped to the examined part by a flexible light conductor in the form of a single rod 114C, as shown in FIG. 6c. The additional light may be a visible color, or it may be an invisible light, such as ultraviolet or infrared light. It should be understood that all types of endoscopes may serve to produce true or arbitrary color images of the examined part in the manner described above.

Another important discovery was that supersonic waves can also be conducted by the image conductor 114 or 114C. By using as a source of image forming radiation piezoelectric or magnetostrictive generators of supersonic waves and conducting said waves to the examined part, we may produce supersonic images. Piezoelectric generators may be in the form of oscillating crystals of quartz, titanium compounds, such as titanates, Rochelle salts and other similar materials. The piezoelectric or magnetostrictive generators can be disposed within the examined body or may be disposed outside of the examined body. The supersonic waves may be directed to the examined part by supersonic lenses or preferably by means of the image conductor 114. The supersonic waves reflected or transmitted by the examined part may be directed to the supersonic image sensitive member by the same image conductor 114 or preferably by an additional image conductor. The supersonic sensitive member may have the form of piezoelectric elements, such as were described above for the supersonic generator, but smaller in size. In another embodiment of invention, the supersonic image sensitive member is a vacuum tube provided with a piezoelectric continuous or mosaic electrode mounted on the inside of the endwall of said tube. Said piezoelectric screen or electrode receives the supersonic image of the examined part through the endwall of said tube and converts said image into an electrical pattern of potentials or charges which correspond to said supersonic image. Such a vacuum tube is provided with a source of electron beam, such as an electron gun for irradiation of said piezoelectric screen or electrode. The electron beam scans said piezoelectric screen or target and converts thereby the electrical pattern present on said screen or electrode into electrical signals in the manner well-known in the television art.

It was also found that the light should be in some cases a polarized light. I found that in many examinations, especially in examination of the human body, the light scattered by the fluids contained in the examined part produces deterioration of contrast and detail of the image. In order to overcome this difficulty, a sheet 160 or a prism of material, such as calcite or tourmaline, which polarizes the light, is placed in front of the light source 7, 109 or 135. Another filter 161, which transmits only the polarized light and reflects the scattered light, is placed in front of the image pickup member 16a, 16B, 16C, 131 or 127. The scattered light is not polarized and will be therefore reflected by the filter 161. As a result, it will, therefore, be prevented from reaching the image pickup element and will not fog the image any more. This improvement applies to all embodiments of invention.

Another complication encountered in operation of this device was fogging of the windows 12 or 18, 152, 153 or any other windows, due to condensation of vapor when entering the parts having a higher temperature, such as recesses of the living body. I found that the use of electrically conducting glass for windows, which is connected to an extraneous source of the electrical potential, prevents the condensation of vapor. Another solution of this problem is to provide a double-walled window containing a transparent silica gel. This improvement applies to all embodiments of my device.

It should be understood that in all embodiments of the invention, the source of illumination may be disposed in such a manner that its long axis is in the long axis of the endoscope or that its long axis is perpendicular to the long axis of the endoscope.

It should be understood that in all embodiments of my invention, the light source or source of an invisible image forming radiation may be disposed inside of the endoscope or may be disposed outside of the endoscope. Furthermore said source of image forming radiation may be supported by the endoscope or may be completely independent of the endoscope. This applies to sources of field illumination and to sources of scanning illumination.

Figure 9:
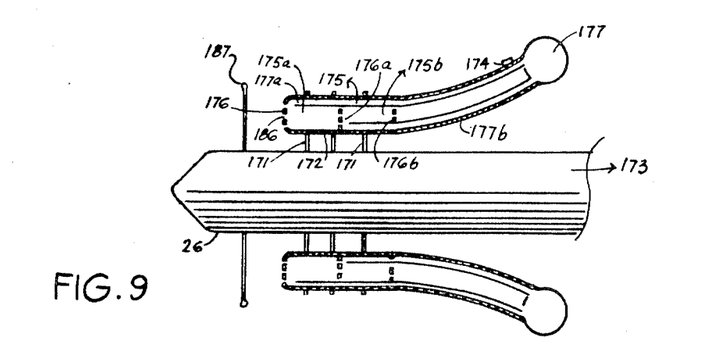
FIGURES 9 and 10 show propulsion means.

It was found that all types of intrascopes described above suffered from the difficulty of introducing them into remote parts of the body. The flexible intrascopes described above were found to coil easily in the passages of the body or to get stuck at the sharp angulations of the examined part or passages. Even the intrascopes consisting only of a bundle of light conducting fibers failed often to pass through angulated passages. This difficulty was solved by the novel construction of the intrascope shown in FIGURE 9 and which will be described below. The intrascope 173 which may be of any of the types described above is provided with a compartment or pouch 175 attached to the housing of said intrascope on the outside. The pouch 175 is of a flexible, but distensible to a little degree, material such as rubber properly prepared for this purpose. The end of the pouch 175 is formed by a cap 176 of an easily distensible material such as rubber which is provided with plural small perforations 186. Pouch 175 is connected to the pump 177 outside of the examined body. The insufflation of the air or gas into pouch 175 causes forward motion of the whole intrascope. The air escapes from the openings 186 and the next insufflation will move the intrascope again. In this way a forward propulsion of the intrascope is achieved. The pouch 175 may be preferably divided into a few subcompartments, each subcompartment having its own cap with perforations as shown in FIGURE 9. Each subcompartment such as 175a or 175b may have independent connections 177a or 177b to the pump 177 so that we may selectively use various subcompartments for the propulsion of the intrascope. In this construction obturating means are provided at each perforated cap 176a or 176b for inflating selectively only one compartment if necessary. The pouch 175 is provided at its proximal end with an opening 174 which is normally closed and serves as an escape valve in case we need fast evacuation of the injected air.

The pump 177 has an output calculated according to the weight of the intrascope, distensibility of the walls of the pouch 175, of the cap 176 and friction produced by the motion of the intrascope. For the best results each insufflation should move the intrascope ¼ to ½ inch at a time.

It was found that a better propulsion is accomplished by making in one of subcompartments one or both sidewalls 172 rigid to prevent their lateral distension. The rigid part 172 cannot be longer than ½ inch in order not to impede the passage of the intrascope. The length of the rigid part will depend on the shape of the part to be examined. The pouch 175 should be releasably attached to the intrascope by means of clamps 171 or hooks or other mechanical devices.

Figure 10:
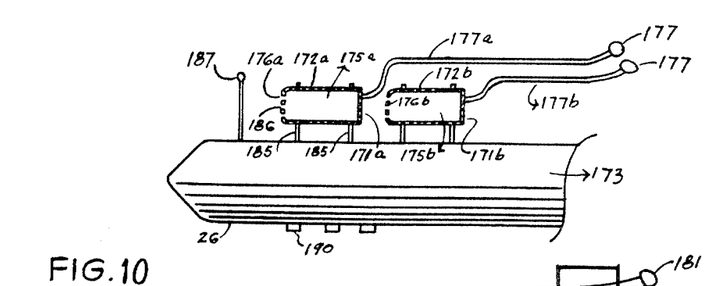

In another modification of my invention, shown in FIGURE 10, each of the compartments 175a or 175b forms an independent unit having its own connection 177a or 177b to the pump 177 or each of them is provided with its own pump. The compartment 175a has a rigid sidewall 172a and a rigid backwall 171a and a distensible perforated front wall 176a and has its own connection 177a to pump 177. Another compartment 175b has distensible sidewalls 172b and a distensible front wall 176b, and a rigid endwall 171b, and its own connection 177b to the pump. Each of said compartments has mechanical means 185 such as clamps or hooks to be releasably attached to the outside wall of the housing of the intrascope.

Figure 11:
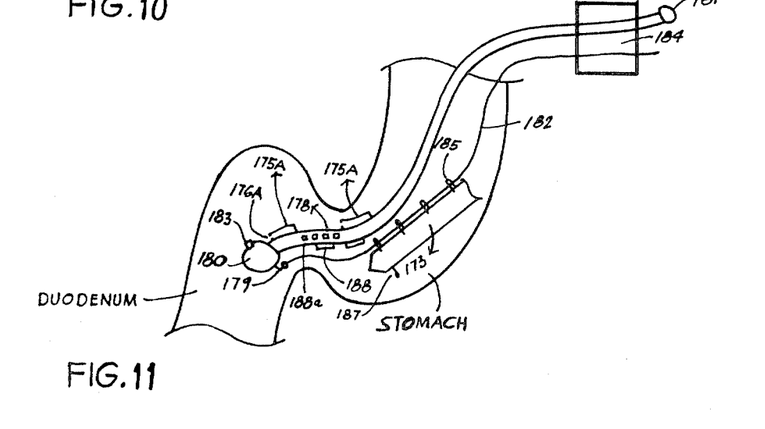
FIGURE 11 shows guiding means.

In some cases it is not sufficient to provide forward propulsion for the intrascope. We must also provide the guidance for the intrascope. It was found that the best way to accomplish this, was to introduce first into the distal end of the examined part a thin flexible tube 178 which may be hollow or solid and which is provided with an inflatable balloon 180 at its end, as shown in FIGURE 11. The tube may be of the type used for the intestinal drainage. In examinations of the upper gastrointestinal tract the tube may be introduced by swallowing it or by pushing it through the mouth in the manner well-known in the art of gastroenterology. After the tube 178 reached the small intestines which can be easily ascertained by the X-ray control or by withdrawing the intestinal fluid from the tube, we inflate the balloon 180 to arrest the motion of the tube 178 and to maintain it in a fixed position. If the tube 178 is a solid type, a special channel is provided for inflation of balloon 180. The tube 178 has at its distal end an extension 179 to which is attached a flexible cord or thread 182. The thread 182 has the length to extend to the outside of the examined body. The proximal end of the thread 182 is releasably attached to a fixed supporting member 184. Also the proximal part of the tube 178 is attached to said supporting member 184. The intrascope 173 is now connected to the thread 178 by means of eyelets, hooks, or other mechanical devices 185. The thread 178 being fixed between the extension 179 and support 184 serves as a guiding path for the intrascope propelled by the jets of air along this path as was explained above. When the examination of one area is finished the air is released from the balloon 180 by means of valve 183 or by the suction effected by the pump 181. The collapse of balloon 180 makes it possible for the tube 178 to move forward being carried by peristaltic waves of the intestine. In case these waves are not sufficiently strong, we may resort to the propelling mechanism of injections of air or gas as was described above.

In addition the tube 178 has one or a few magnets 188 or electromagnets attached to its wall, at the distal end, as shown in FIG. 11. A better construction shown in FIGURE 11 is to disperse magnetic particles 188a in the material of which the wall of the tube 178 is made such as rubber, latex or plastic. The use of magnets was found to be an important improvement in the guiding of the tube 178 into inaccessible passages.

In some cases small permanent magnets are incorporated into wall of the tube 178 and spaced apart from each other in order not to impair the flexibility of said tube.

In examination of the rectum and colon in which we cannot use the peristaltic action of the intestine, the tube 178 must have the distensible compartments 175 or 175A for its propulsion in the intestine. The compartments 175A are essentially of the same construction as was described above for compartment 175a being however much smaller in size as the weight of the tube 178 is obviously much smaller than that of the intrascope. The use of plural compartments 175A was found to be of a great advantage to prevent coiling of the tube 178 and subsequent arrest of its motion.

In addition it was found that the blast of air or gas from the pouch 175 escaping from the cap 176 may injure the adjacent parts of the examined organ. A shield 187 was provided opposite the openings 186 in the cap to absorb the impact of the jets of air. The shield 187 may be attached to the housing of the intrascope 173 by any mechanical means. The width of the pouch 175 or of the separate compartments 175a should preferably not exceed 0.5 centimeter and depends on passages examined. The location of the pouch 175 or of separate compartment 175a in relation to the intrascope 173 was found to be of great importance, especially in examinations of the upper gastrointestinal tract. It was found that the distal end of the propelling pouch 175 or compartments 175a should be preferably at least 6 cm. proximally to the viewing window of the intrascope 173.

In some cases the tube 178 should be provided in addition with a source of light such as a miniature electrical bulb.

It should be understood that all devices described above or illustrated are not limited to examinations of humans but may be used as well for examination of internal parts of animals or of inaccesible parts of machinery.

In addition all intrascopes are provided with one or a few magnets 190 or electromagnets attached to their housing 26 in the distal part, as shown. A better construction, shown in FIGURE 9 is to disperse magnetic particles in the material of which the housing of intrascopes or its coverings 26a is made such as rubber or plastic. In some cases the spiral spring sheet of the flexible part 2a of the intrascope may of Alnico or standard magnets instead of bronze or stainless steel as was described above. In some cases stainless steel may be used and may be magnetized before the introduction into examined part. In some cases inserts or permanent magnets may be incorporated into housing 26 spaced apart from each other in order not to impair the flexibility of the intrascope.

It should be understood that the term "light" used in specification and in appended claims comprises both visible and invisible radiations and also represents both electromagnetic, acoustic and corpuscular radiations.

It should be understood that the term "gas" in the specification and in the claims embraces the use of gaseous and of fluid means as well.

It should be further understood that in all embodiments of my invention the source of image forming radiation may be disposed outside of the examined body and projected into the examined body by a suitable optical system or by a light conductor.

My device may also be used, instead for reproducing images, for transmitting signals from the interior of the examined part, which signals represent desired information.

As various possible embodiments might be made of the above invention, and as various changes might be made in the embodiment above set forth, it is to be understood that all matter herein set forth or shown in the accompanying drawings is to be interpreted as illustrative and not in a limiting sense.

What is claimed is:

1. An endoscope for examination of a remote inner area inside of a body comprising in combination an elongated tubular housing having proximal and distal ends and a flexible portion adapted in size and shape for introducing into said body, including flexible light conducting means operating by internal reflection of light connected to said housing for transmitting light from an external source of light for illuminating said inner remote area, said light-conducting flexible means comprising at least one entirely solid fiber, said fiber being provided with a core of light-transparent material having a high index of refraction and a coating having a lower index of refraction than said core for preventing escape of light, a window in said housing for admitting the image of said examined area, an image-conducting bundle of entirely solid fibers comprising a plurality of fibers operating by internal reflection of light and disposed in said housing for receiving and transporting said image, essentially each of said plurality of fibers having a core of light-transparent material having a high index of refraction and essentially each of said plurality of fibers covered by a coating, said coating being of a material having a lower index of refraction than said light-transparent material, said coating being relatively thin in comparison to said core and spacing each of said fibers from adjacent fibers for preventing escape of light from one fiber to another, said fibers being long in relation to their diameter so that the light is reflected in said fibers internally a number of times without appreciable loss of intensity, said fibers furthermore being assembled so as to provide an endface of an appreciable cross-section, said image conducting bundle comprising in addition means for maintaining essentially all said fibers in a fixed relationship to each other, said maintaining means being provided only at each end of said bundle.

2. A device as defined in claim 1, in which said coating a has a thickness not exceeding a few microns.

3. A device as defined in claim 1, in which device at least a substantial number of said fibers is free from each other along the major part of their length.

4. A device as defined in claim 1, which comprises in addition an inflatable member, and a source of gas under pressure, said inflatable member externally mounted in relation to said endoscope and having a distensible wall being provided with a plurality of small openings extending entirely through said wall, said openings being arranged spatially in a predetermined pattern so that propulsion of said endoscope is permitted upon intermittent gas pressure being supplied to said inflatable member, means attaching said inflatable member to said endoscope without obstructing said openings, said source of gas disposed outside of said endoscope and having means connecting said source with said inflatable member, whereby the intermittent inflating of said inflatable member with said gas accomplishes propulsion of said endoscope in said passages.

5. An endoscope for examination of a remote inner area inside of a body comprising in combination an elongated tubular housing having proximal and distal ends and a flexible portion adapted in size and shape for introducing into said body, including flexible light-conducting means operating by internal reflection of light connected to said housing for transmitting light from an external source of light separated from said housing for illuminating said inner remote area, said light-conducting flexible means comprising at least one entirely solid fiber, said fiber being provided with a core of light-transparent material having a high index of refraction and a coating having a lower index of refraction than said core for preventing escape of light, a window in said housing for admitting the image of said examined area, an image conducting bundle of entirely solid fibers comprising a plurality of fibers operating by internal reflection of light and disposed in said housing for receiving and transporting said image, essentially each of said plurality of fibers having a core of light-transparent material having a high index of refraction and essentially each of said plurality of fibers covered by a coating, said coating being of a material having a lower index of refraction than said light-transparent material, said coating being relatively thin in comparison to said core and spacing each of said fibers from adjacent fibers for preventing escape of light from one fiber to another, said fibers being long in relation to their diameter so that the light is reflected in said fibers internally a number of times without appreciable loss of intensity, said fibers furthermore being assembled so as to provide an endface of an appreciable cross-section, said image-conducting bundle comprising in addition means for maintaining essentially all said fibers in a fixed relationship to each other, said maintaining means being provided only at each end of said bundle.

6. An endoscope for examination of a remote inner area inside of a body comprising in combination an elongated tubular housing having proximal and distal ends and a flexible portion adapted in size and shape for introducing into said body, including flexible light-conducting means operating by internal reflection of light connected to said housing for transmitting light from an external source of light for illuminating said inner remote area, said light-conducting flexible means comprising at least one entirely solid fiber, said fiber being provided with a core of light-transparent material having a high index of refraction and a coating having a lower index of refraction than said core for preventing escape of light, a window in said housing for admitting the image of said examined area, an image conducting bundle of entirely solid fibers comprising a plurality of fibers operating by internal reflection of light and disposed in said housing for receiving and transporting said image, essentially each of said plurality of fibers having a core of light-transparent material having a high index of refraction and essentially each of said plurality of fibers covered by a coating, said coating being of a material having a lower index of refraction than said light-transparent material, said coating being relatively thin in comparison to said core and spacing each of said fibers from adjacent fibers for preventing escape of light from one fiber to another, said fibers being long in relation to their diameter so that the light is reflected in said fibers internally a number of times without appreciable loss of intensity, said fibers furthermore being assembled so as to provide an endface of an appreciable cross-section, said image conducting bundle comprising in addition means for maintaining essentially all said fibers in a fixed relationship to each other, said maintaining means being provided only at each end of said bundle, said endoscope furthermore comprising photoelectric means mounted in cooperative relationship with said image conducting bundle and said housing.

7. A device as defined in claim 6, in which said photoelectric means are mounted in a vacuum tube.

8. An endoscopic device for introduction into remote and tortuous passages comprising in combination a flexible elongated tubular member, an inflatable member, and a source of gas under pressure, said inflatable member externally mounted in relation to said tubular member and having a distensible wall being provided with a plurality of small openings extending entirely through said wall, said openings being arranged spatially in a predetermined pattern so that propulsion of said tubular member is permitted upon intermittent gas pressure being supplied to said inflatable member, means attaching said inflatable member to said tubular member without obstructing said openings, said source of gas disposed outside of said tubular member and having means connecting said source with said inflatable member, whereupon by intermittently inflating said inflatable member with said gas propulsion of said tubular member in said passages is accomplished.

9. A device, as claimed in claim 8, in which said tubular member is further provided with a plurality of fibers conducting light by internal reflection.

10. A device, as claimed in claim 8, in which said tubular member is further provided with means for producing images of said passages.

11. A device, as claimed in claim 8, in which said elongated tubular member is further provided with means for conducting images of said passages.

12. A device, as defined in claim 8, in which said tubular member is provided with a plurality of said inflatable members separated from each other.

References Cited by the Examiner

UNITED STATES PATENTS

| | | | |
|---|---|---|---|
| 2,389,935 | 11/1945 | Rothstein | 313—148 |
| 2,437,418 | 3/1948 | Cawein | 313—148 |
| 2,470,665 | 5/1949 | Stiehl | 128—276 |
| 2,576,100 | 11/1951 | Brown | 313—148 |
| 2,747,131 | 5/1956 | Sheldon | 315—11 |
| 2,747,132 | 5/1956 | Sheldon | 315—11 |
| 2,764,148 | 9/1956 | Sheldon | 128—4 |
| 2,764,149 | 9/1956 | Sheldon | 128—6 |
| 2,788,390 | 4/1957 | Sheldon | 128—8 |
| 2,855,934 | 10/1958 | Daughaday | 128—349 |
| 2,863,458 | 12/1958 | Modny et al. | 128—303 |
| 2,877,368 | 3/1959 | Sheldon | 128—4 |
| 2,975,785 | 3/1961 | Sheldon | 128—6 |
| 2,987,960 | 6/1961 | Sheldon | 128—6 |
| 3,010,357 | 11/1961 | Hirschowitz | 128—6 |
| 3,021,834 | 2/1962 | Sheldon | 128—6 |
| 3,071,137 | 1/1963 | Niebel et al. | 128—276 |
| 3,091,235 | 5/1963 | Richards | 128—6 |
| 3,100,482 | 8/1963 | Hett | 128—6 |
| 3,168,092 | 2/1965 | Silverman | 128—348 X |

FOREIGN PATENTS 179,905  10/1954  Austria.

OTHER REFERENCES

Livingston and Pack article in "Surgery Gynecology & Obstetrics," vol. 72, No. 6, June 1941, pages 559–560.

Kapany article in the book "Concept of Classical Optics" by Strong and published by W. H. Freeman & Co. Inc., 1958, pages 565–566.

Van Heel "Optische Afbeelding Zonder Lenzen of Afbeeldingsspiegels," from De Ingenieur, vol. 12, June 12, 1953, pp. 25–27.

RICHARD A. GAUDET, *Primary Examiner.*

JORDAN FRANKLIN, *Examiner.*

R. D. TEGTMEYER, D. L. TRULUCK,
*Assistant Examiners.*